Feb. 17, 1970     C. F. KIRKLAND     3,495,814
COOLANT SCRAP HANDLING APPARATUS
Filed July 19, 1967     2 Sheets-Sheet 2
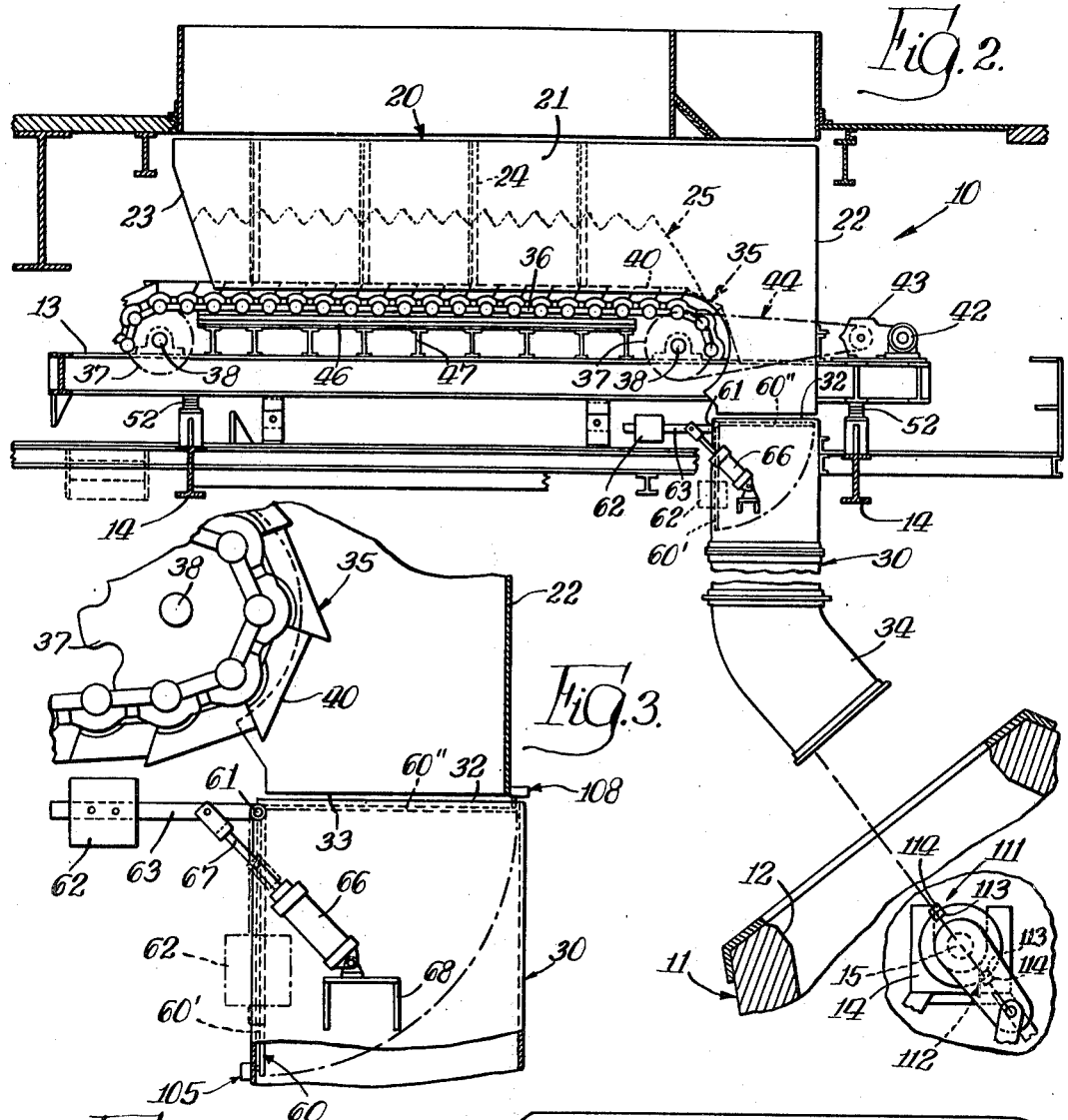
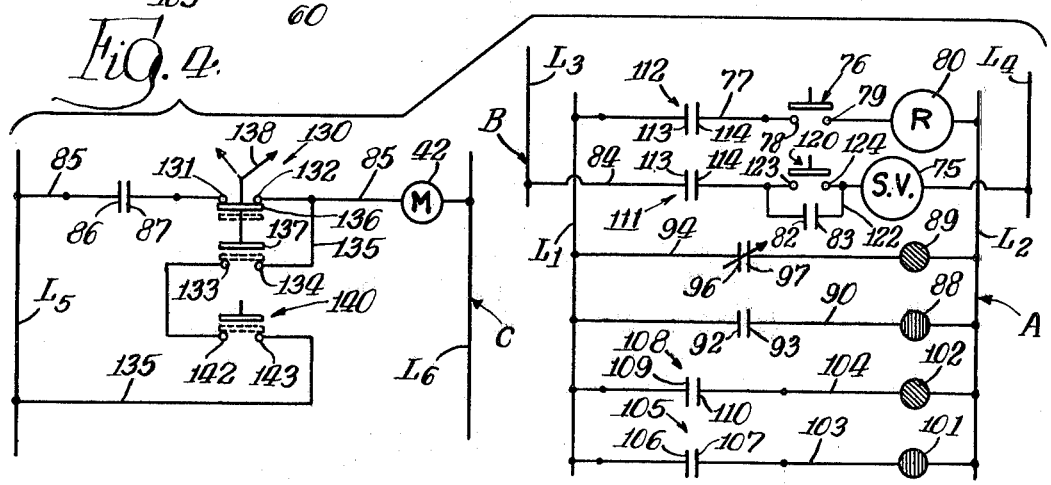

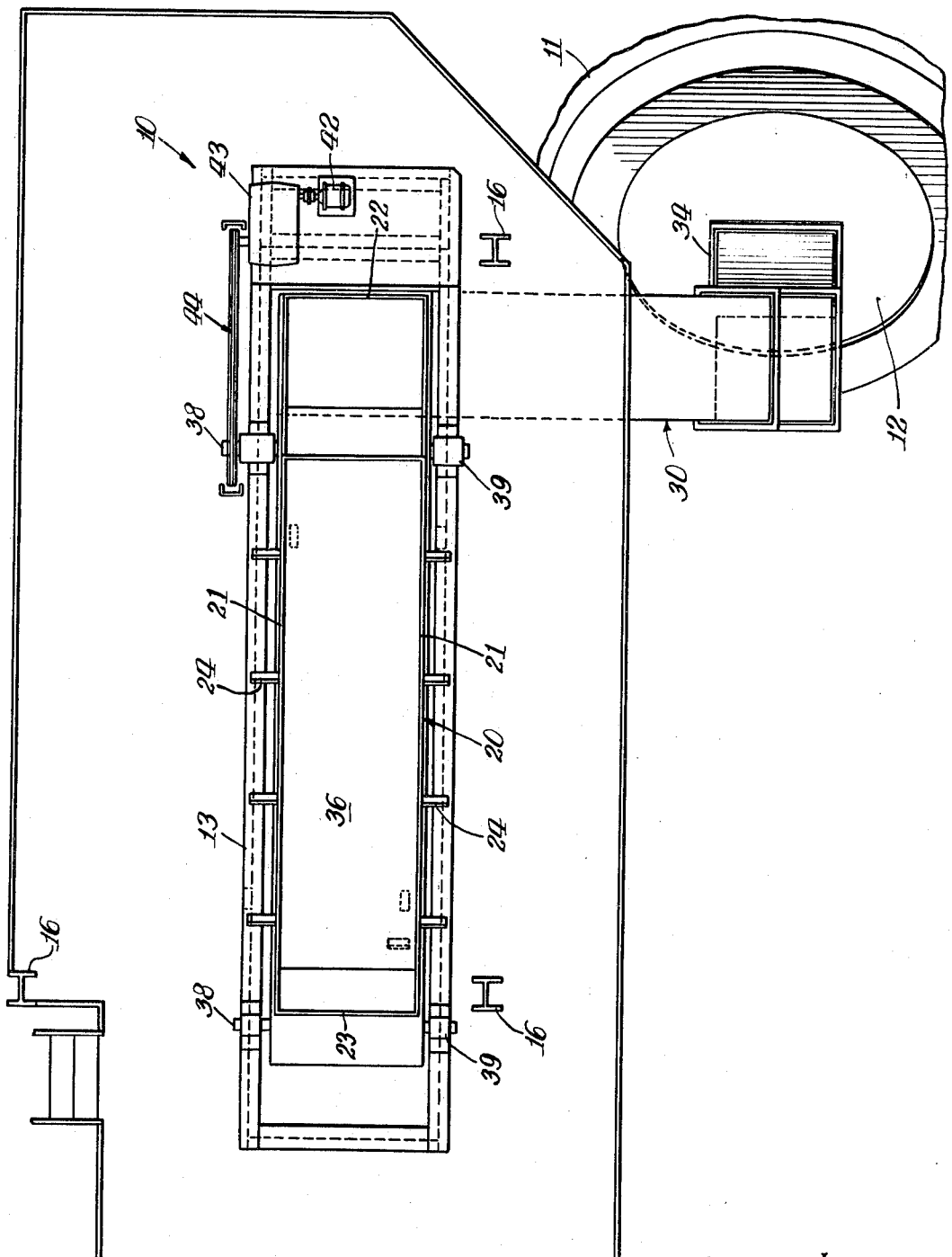

United States Patent Office 3,495,814
Patented Feb. 17, 1970

3,495,814
COOLANT SCRAP HANDLING APPARATUS
Charles F. Kirkland, Hammond, Ind., assignor to Inland Steel Company, Chicago, Ill., a corporation of Delaware
Filed July 19, 1967, Ser. No. 654,614
Int. Cl. F27b 5/12; C21c 7/00; G01g 13/32
U.S. Cl. 266—27                                      10 Claims

ABSTRACT OF THE DISCLOSURE

An apparatus for supplying measured quantities of coolant material, particularly scrap metal, from an elevated bin containing a bulk supply of such material to a point of use, such as an oxygen steelmaking converter or other metallurgical furnace. A conveyor at the bottom of the bin serves to discharge material into a chute at one end of the bin from which the material is directed to the furnace. A safety gate is provided at the upper end of the chute to prevent pieces of scrap from accidentally falling through the chute. When the apparatus is employed to supply coolant scrap to a metallurgical furnace of the tiltable type, position sensing means associated with the furnace prevents opening of the safety gate and operation of the conveyor until the furnace is aligned with the chute to receive the scrap.

BACKGROUND OF THE INVENTION

Field of the invention

This invention relates generally to an apparatus for supplying irregularly shaped pieces of material to a point of use, and more particularly relates to an apparatus for supplying accurately measured quantities of metal scrap to a metallurgical furnace for rapidly cooling the contents thereof.

Description of the prior art

Various type of feeding and weighing devices have been developed heretofore for dispensing particulate material to a point of use, such as a metallurgical furnace. Many of such devices include conveyors for transporting the material from a remote storage bin or hopper to a dispensing chute and thence to a point of use. In addition, various types of measuring devices have been utilized in connection with such apparatus, which provide a continuous indication of the weight of material supplied to the point of use. The Lindquist U.S. Patent No. 805,737 and the Henderson et al. U.S. Patent No. 2,888,026 are exemplary of apparatus of this type.

While the feeding or charging devices disclosed in the prior art may be generally satisfactory for their intended purpose, so far as is known, none are capable of rapidly supplying accurately measured amounts of irregularly shaped metal scrap to a metallurgical furnace for cooling a molten charge in the furnace nor do they include adequate safeguards for protecting personnel from falling pieces of scrap when the apparatus is inoperative or for preventing operation of the apparatus when the mouth of the associated furnace is not properly aligned with respect to the discharge chute of the apparatus.

SUMMARY

Briefly described, the present invention contemplates a novel apparatus for supplying accurately measured quantities of metal scrap or other coolant material to a point of use, such as an oxygen steelmaking converter or other tiltably mounted metallurgical furnace, for rapidly lowering the temperature of a molten charge in the furnace. The apparatus, to be hereinafter described in detail, includes an elongated container or storage bin adapted to be mounted in an elevated position with respect to the furnace and having a chute at one end thereof for directing the scrap into the open mouth of the furnace when the latter is positioned to receive scrap. Conveyor means at the bottom of the bin serves to discharge a desired quantity of scrap into the upper end of the chute when the apparatus is in operation.

The scrap handling apparatus of the present invention also includes a safety gate in the chute for protecting personnel from pieces of scrap which may accidentally fall into the chute when the furnace is in a position other than its scrap-receiving position or is otherwise inoperative. The present apparatus also includes position sensing means associated with the furnace for preventing opening of the safety gate and operation of the conveyor and the discharge of scrap from the bin unless the furnace is in a scrap-receiving position.

Accordingly, it is a general object of the present invention to provide a novel apparatus for rapidly dispensing a desired quantity of discrete material to a point of use.

A more particular object is to provide a novel apparatus of the foregoing character for supplying accurately measured quantities of metal scrap or other coolant material to a metallurgical furnace for effecting rapid cooling of the contents thereof.

Another object is to provide a novel scrap handling apparatus of the foregoing character which includes safety features to prevent misoperation of the apparatus and to prevent injury to personnel in the vicinity of the apparatus due to the unintentional discharge of scrap therefrom.

Other objects and advantages of the invention will be apparent from the following detailed description and accompanying sheets of drawings.

DESCRIPTION OF THE DRAWINGS

FIG. 1 is a top plan view of a scrap handling apparatus embodying the features of the present invention, and showing the open mouth portion of an associated oxygen steelmaking converter or furnace when the latter is in a scrap-receiving position with respect to the apparatus;

FIG. 2 is a side elevational view of the apparatus shown in FIG. 1 with portions of the elongated discharge chute and the furnace being broken away for convenience of illustration;

FIG. 3 is an enlarged fragmentary side elevational view of a portion of the apparatus shown in FIG. 2; and FIG. 4 is a schematic circuit diagram of the control system of the apparatus.

DESCRIPTION OF THE PREFERRED EMBODIMENT

In FIGS. 1 and 2 a scrap handling apparatus, indicated generally at 10, embodying the features of the present invention is illustrated. As best seen in FIG. 2, the apparatus 10 is adapted to be mounted in elevated position with respect to its point of use, preferably above a metallurgical furnace such as an oxygen steelmaking converter or vessel 11 having an open mouth 12. The furnace 11 is mounted on conventional trunnions 15 received in a support 14 (FIG. 2) for tilting movement between an upright position and a tilted scrap-receiving position. The apparatus 10 may be mounted on a rectangular frame 13 supported on cross beams 14 (FIG. 2) which are secured to the upper ends of a plurality of vertically extending I-beams 16 (FIG. 1).

Mounted on the frame 13 is an elongated generally rectangular storage bin 20 having vertically extending spaced side walls 21, connecting end walls 22 and 23, and an open bottom. The sidewalls 21 of the bin may be supported by a plurality of vertically extending uprights 24 secured to the frame 13. A bulk supply of steel scrap in the bin 20 is indicated schematically at 25 in FIG. 2.

For directing coolant material, such as the steel scrap 25, from the bin 20 to the mouth 12 of the furnace 11, an elongated chute 30 is provided at one end of the bin. The chute 30 may be of any desired construction and configuration but, as shown in FIGS. 1 and 2, is preferably rectangular in cross-section and is arranged with its upper end 32 in registry with a discharge opening 33 at one end of the bin 20. The chute 30 has its lower or discharge end 34 bent at an angle from the vertical, such as an angle of approximately 40° from the vertical to correspond to the tilted scrap-receiving position of the furnace 11.

As heretofore mentioned, the bottom of the bin 20 is open. For closing such opening and for discharging scrap into the open end 32 of the chute 30, an elongated conveyor means, indicated generally at 35, is provided. The conveyor means 35 may be of any desired type and construction so long as it is capable of handling the type of material to be supplied to the furnace 11 for cooling the contents thereof. The conveyor means 35 in the illustrated embodiment of the invention includes an endless belt or apron 36 extending around a pair of spaced drive members or sprockets 37 at each end thereof, the sprockets 37 being mounted on cross-shafts 38 journalled in bearings 39 which are secured to the frame 13. The belt or apron 36 may be provided with flights 40 (FIGS. 2 and 3) to facilitate movement of the scrap toward the upper end 32 of the chute 30. Movement of the conveyor belt 36 is achieved by drive means in the form of an electric motor 42 mounted on the frame 13. The motor 42 may be directly connected to the conveyor belt 36, but, as shown in FIGS. 1 and 2, the motor 42 is preferably connected to a speed reducer 43 which is in turn connected to the belt 36 through a suitable chain or belt drive 44 connected to one of the shafts 38. As will hereinafter appear, slow speed operation of the conveyor 35 is highly desirable when feeding coolant scrap to a furnace.

In order to support the upper run of the conveyor belt or apron 36 when the bin 20 is filled with metal scrap or other coolant material, a platform 46 is mounted on the frame 13 immediately below the open bottom of the bin 20 and the upper run of the belt 36 rests on the platform. The platform 46 may be supported by I-beams 47 mounted on the frame 13. As will be evident from the drawings, the rectangular chute 30 has substantially uniform dimensions throughout its length so that there are no narrowing or funnel-like restrictions to impede the passage of scrap from the bin to the furnace. This is an important consideration in feeding irregular and relatively large pieces of scrap metal. For example, merchant mill scrap which is conveniently used as coolant material in an oxygen steelmaking converter may be as large as 4" x 4" x 18".

In order to permit a predetermined quantity or weight of scrap to be discharged from the bin 20 in to the chute 30 and thence to the furnace 11, the apparatus 10 includes weight measuring means. Such weight measuring means preferably comprises four symmetrically spaced load cells 52 engaging the underside of the frame 13 and supported by the cross beams 14. The load cells 52 may be of any suitable type, e.g. hydraulic, electrical, or mechanical, so long as they produce a signal which varies as a function of the load applied thereto.

The load cells 52 are subjected not only to the weight of the contents of the bin 20 but also to the weight of the bin itself, the conveyor 35, the frame 13 and other structure. Since the weight of the contents of the bin 20 is the only variable, a suitable device (not shown) is provided for receiving the signals from the load cells 52 and translating these signals into a visual indication of the weight of the contents of the bin 20. Consequently, an operator of the apparatus 10 can readily determine at any time, on the basis of the change in the gross weight of the apparatus 10, how much coolant material has been discharged from the bin 20.

With the foregoing construction, it will be apparent that unless the mouth 12 of the furnace 11 is in the aligned position illustrated in FIGS. 1 and 2 for receiving scrap from the lower end 34 of the chute 30, miscellaneous pieces of scrap which may accidentally become dislodged from the bulk quantity thereof in the bin 20 could fall through the chute 30 and cause serious injury to personnel in the vicinity of the furnace. To prevent such an occurrence, the apparatus 10 includes a safety gate 60 positioned at the upper end 32 of the chute 30.

As best seen in FIGS. 2 and 3, the gate 60 preferably comprises a steel plate hinged, as at 61, at the upper end 32 of the chute so as to be movable between an open or vertical position adjacent one of the vertical side walls of the chute, as designated at 60', and a closed or horizontal position indicated at 60" wherein the gate is disposed horizontally and spans the interior of the chute to prevent passage of any material therethrough.

Due to the size and weight of the gate, movement thereof from its open position 60' to its closed position 60" is facilitated by the provision of a counterweight 62 secured to the outer end of an arm 63, the inner end of which is rigidly secured to the gate. As will be apparent from FIGS. 2 and 3, the arm 63 preferably extends perpendicularly to the plane of the gate 60.

Movement of the gate 60 between its respective open and closed positions 60' and 60" may be accomplished in any desired manner, but as shown, such movement is achieved by a pneumatic cylinder 66 having a piston (not shown) therein to which one end of an extensible and retractable plunger or rod 67 is connected. The other end of the rod 67 is pivotally connected to the arm 63. The cylinder 66 is pivotally secured to a support 68 mounted on the outside of the chute 30. Air is supplied selectively to either end of the cylinder 66 by suitable control means including a solenoid valve as described below.

The control means for the apparatus is shown diagrammatically in FIGURE 4. A solenoid valve 75 is provided to permit air under pressure from a source thereof (not shown) to enter the lower end of the cylinder 66 to swing the gate 60 from its closed position 60" to its open position 60' against the action of the counterweight 62. Simultaneous energization of the conveyor drive motor 42 effects movement of the conveyor 35 to cause the desired amount of scrap to be discharged into the open upper end 32 of the chute 30.

Simultaneous energization of the solenoid valve 75 and the conveyor drive motor 42 is controlled by a normally actuated switch or push button 76 preferably located remotely from the apparatus 10 such as in a control booth or pulpit. The push button 76 is positioned in one branch 77 of an electrical circuit indicated generally at A, and is effective when depressed to bridge a pair of contacts 78 and 79. The contacts 78 and 79 are in series with the coil of a relay 80 and thus serve to connect the relay 80 to the respective sides, indicated at $L_1$ and $L_2$, of the circuit A. When energized, the relay 80 causes closing of a pair of normally open contacts 82 and 83 in a parallel branch 122 of a branch 84 of another circuit B, thereby by-passing a special manual switch 120 (hereinafter described) in the branch 84. The contacts 82 and 83 are in series with the solenoid valve 75 so that when the contacts are closed, the solenoid valve 75 is connected to the respective sides, indicated at $L_3$ and $L_4$ of the circuit B. Consequently, the gate 60 is swung to its open position 60'. A pair of limit switches 111 and 112 in the branches 84 and 77, respectively, must also be closed before the push button 76 is depressed, as described below, in order to render the system operative.

Depression of the push button 76 and energization of the relay 80 also causes closing of another set of normally open contacts 86 and 87 in a branch 85 of another circuit C. Closure of the contacts 86 and 87 connects the conveyor drive motor 42 to the respective sides $L_5$ and $L_6$ of the circuit C and thereby energizes the motor to discharge scrap into the upper end 32 of the chute 30 and through the open gate 60 for delivery to the furnace 11 so long as the push button 76 is held depressed. To complete the motor circuit, a switch 130 must also be in closed position bridging a pair of contacts 131 and 132 in the branch 85, as described below.

When the push button 76 is mounted on a control panel (not shown) positioned at a remote control station or pulpit, it is desirable that an operator of the apparatus 10 known whether or not the conveyor drive motor 42 is running when the push button 76 is depressed. To this end, a pair of different colored indicator lights, respectively indicated at 88 and 89, may be provided on the same control panel as the push button 76 for indicating the operative condition of the conveyor 35. The indicator light 88 is preferably colored red and is connected in another branch 90 of the circuit A and has a normally open pair of contacts 92 and 93 in series therewith. The indicator light 89 is preferably colored green and is connected in another branch 94 of the circuit A and has a normally closed pair of contacts 96 and 97 in series therewith. The two sets of contacts 92, 93 and 96, 97 are controlled by the relay 80 such that when the relay 80 is energized by disclosure of the push button 76, the normally open set of contacts 92 and 93 are caused to close and the normally closed set of contacts 96 and 97 are caused to open. Consequently, when the conveyor motor 42 is energized, the red indicator light 88 will be turned on and the green indicator light 89 will be turned off. Conversely, when the conveyor motor 42 is inoperative, the green indicator light 89 will be turned on and the red indicator light 88 will be turned off.

When the push button 76 is located remote from the apparatus 10, it is also desirable that the operator know whether or not the gate 60 is in its open or closed positions. To this end, another pair of colored indicator lights, respectively indicated at 101 and 102, may be provided on the same control panel as the push button 76, in addition to the lights 88 and 89, for indicating the position of the gate 60 in the chute 30. The indicator light 101 is preferably colored red and is connected in another branch 103 of the circuit A, while the light 102 is preferably colored green and is connected in still another branch 104 of the circuit A. A limit switch 105 having a pair of normally open contacts 106 and 107 in series with the lamp 101 is provided in the branch 103 of the circuit A for controlling the operation of lamp 101, and another limit switch 108 having a pair of normally open contacts 109 and 110 is positioned in the branch 104 of the circuit A for controlling the operation of the lamp 102. The limit switch 105, as shown in FIG. 3, is located on the side of the chute 30 for actuation by gate 60 when the latter is in its open position 60′, and the limit switch 108 is located adjacent the open end 32 of chute 30 for actuation by the gate 60 when the latter is in its closed position 60″.

Thus, when the push button 76 has been depressed to actuate the conveyor drive motor 42 and the solenoid valve 75 has been energized to swing the gate 60 from its closed position 60″ to its open position 60′, the normally open contacts 106 and 107 of the limit switch 105 will be closed and the normally open contacts 109 and 110 of the limit switch 108 will remain open. Consequently, the red lamp 101 will be turned on and the green lamp 102 will be turned off. Conversely, when the push button 76 is released to render the apparatus 10 inoperative, the solenoid valve 75 will move to a position to supply air to the upper end of the cylinder 66 and thus cause the gate 60 to be swung from its open position 60′ to its closed position 60″. When the gate 60 is held in its closed position 60″ by the combined effect of air pressure and the counterweight 62, the normally open contacts 106 and 107 of the limit switch 105 will be open and the normally open contacts 109 and 110 of the limit switch 108 will be closed. Consequently, the red lamp 101 will be turned off and the green lamp 102 will be turned on to indicate that the gate 60 is in its closed position.

To avoid unintentional or inadvertent discharge of scrap from the bin 20 when the furnace 11 is not in proper aligned position to receive scrap from the chute 30, the control means also includes position sensing means in the form of a pair of limit switches 111 and 112 (FIGS. 2 and 4) operatively associated with the furnace trunnions 15 and the support 14 and positioned in the branches 84 and 77, respectively, of the circuit A and in series with the solenoid valve 75 and the coil of the relay 80, respectively. Each limit switch 111 and 112 includes a pair of contacts 113 and 114 arranged so as to remain open until the mouth 12 of the furnace 11 is in substantial alignment with the lower or discharge end 34 of the chute 30. Such condition of alignment may occur, for example, when the axis of the furnace 11 is tilted toward the lower end 34 of the chute at an angle of about 40° from the vertical. When the furnace 11 is so positioned, the contacts 113 and 114 of the limit switches 111 and 112 close, thereby permitting current flow to the solenoid valve 75 and to the coil of the relay 80, as heretofore described. Otherwise, the contacts 113 and 114 will not close and the apparatus 10 will remain inoperative regardless of the position of the push button 76.

At the termination of a scrap charging operation wherein a desired quantity of scrap has been discharged from the bin 20 through the chute 30 and into the furnace 11, one or more pieces of scrap may become wedged between the gate 60 and the inner walls of the chute 30 so as to prevent the gate 60 from closing fully. It is therefore desirable to dislodge such scrap to permit the gate 60 to fully close and thus minimize the possibility of injury to personnel in the vicinity of the lower discharge end 34 of the chute should the wedged pieces of scrap become accidentally dislodged. To this end, another manually actuated push button or jog button 120 is provided in the branch 84 of the circuit B so as to permit momentary energization of the solenoid valve 75 without energization of the relay 80 and the conveyor drive motor 42. Thus, a pair of contacts 123 and 124 are provided in the branch 84 which are abridged by the jog button 120 when the latter is manually depressed by the operator. When the jog button 120 is depressed momentarily, current is supplied to the solenoid valve 75 thereby causing the gate 60 to swing toward its open position 60′ and thus release any scrap which may have been lodged between the gate and the side walls of chute 30. When the push button 120 is released, the gate 60 will move to its fully closed position 60″, thereby closing the contacts 109 and 110 of the limit switch 108 and causing the green lamp 102 to be turned on. Consequently, an operator at a remote location from apparatus 10 is informed that the chute is free of scrap and the gate 60 is closed.

The control means for the apparatus also includes another manually actuated switch 130 to permit operation of the apparatus 10 from a point closely adjacent thereto when necessary rather than from the remote control station. The switch 130 has an actuating lever 138 movable between a first position (full lines) in which the apparatus is controlled from the remote station and a second position (dotted lines) in which the apparatus is controlled locally. The switch 130 includes a first pair of contacts 131 and 132 in the branch 85 connected to the conveyor drive motor 42 and another set of contacts 133 and 134 in a branch 135 having one end thereof connected to the branch 85 between the switch 130 and conveyor drive motor 42 and its other end connected to the side $L_5$ of the circuit C. A pair of conductor bars 136 and 137 are provided in the switch 130 and are shiftable with respect to the contacts 131, 132 and 133, 134, such that when the switch actuating lever 138 is moved from its full line to its dotted line position shown in FIG. 4, the bar 136 will be disengaged from contacts 131 and 132 and the bar 137 will bridge the contacts 133, 134. Thus, the current flow to the conveyor drive motor 42 is no longer under the control of the push button 76 and relay 80. Energization of the conveyor drive motor 42 from the vicinity of the apparatus 10 is then achieved by manually depressing another push button 140 serving in the branch 135 to bridge a pair of contacts 142 and 143 in series with contacts 133 and 134. Consequently, the conveyor drive motor 42 is connected across the sides $L_5$ and $L_6$ of the circuit C and scrap will be discharged from the bin 20 into the chute 30 as desired. As will be understood, when the lever 138 is in its full line position seen in FIG. 4, the contacts 131 and 132 are bridged by the bar 136 and the branch 135 is disconnected from the system so that the push button 140 is rendered inoperative and the apparatus is controlled in the usual manner by the push button 76 at the remote control station.

When the apparatus 10 is in operation, the aforementioned weight indicating device (not shown) provides an automatic signal indicative of the change in gross weight of the apparatus 10 and the amount of scrap discharged from the bin 20 into the furnace 11. Such weight indicating means may be of any type or form but is preferably in the nature of a graphic display or digital counter at the control panel of the remote control station. Thus, assuming that the weight of scrap to be added to the furnace 11 for cooling the contents thereof has been previously calculated, the operator need only depress the push button 76 and operate the conveyor for a period of time sufficient to bring the desired net weight of the bin into view on the graphic display and then release the button. In order to facilitate such operation, an auxiliary manually settable graphic display device may be provided on the control panel adjacent the automatic counter. The manually settable counter may thus be preset, prior to operation of the apparatus 10, to indicate the desired net weight of the bin and contents. The operator then depresses the push button 76 until the readings on the two counters coincide and then releases the button. Alternatively, the control system could be arranged so that the operator need only depress the button 76 to start the conveyor and the button will automatically be released when the readings on the two counters coincide. The conveyor 35 is preferably powered for slow speed operation so that the operator can inch the conveyor to discharge only small increments of scrap, especially when approaching the end of the batch discharge period. Thus, accurate control is maintained over the amount of scrap fed to the furnace.

Although the invention has been described with particular reference to a single specific embodiment, it will be understood that various modifications and equivalents may be resorted to without departing from the scope of the invention as defined in the appended claims.

I claim:

1. In combination a metallurgical furnace, such as an oxygen steelmaking converter; apparatus for supplying a predetermined weight of coolant material, such as steel scrap, to said furnace; said apparatus comprising a storage bin adapted to contain a bulk supply of coolant material and mounted in an elevated position with respect to said furnace, an elongated chute extending downwardly from said bin, said chute having an upper end arranged to receive coolant material from said bin and a lower end arranged to deliver coolant material to said furnace, conveyor means at the bottom of said bin and arranged to discharge coolant material into the upper end of said chute, drive means for operating said conveyor means, weight measuring means associated with said bin for measuring the weight of coolant material discharged into said chute, a safety gate in said chute for preventing accidental discharge of coolant material therefrom, and gate operating means for opening and closing said gate; and control means for controlling the operation of said drive means and hence the amount of coolant material supplied to said furnace, said control means including means preventing opening of said gate except when said furnace is in a predetermined coolant-receiving position with respect to the lower end of said chute.

2. The apparatus of claim 1, further characterized in that said furnace comprises an open mouthed vessel adapted to be tilted between an upright position and said predetermined position wherein the mouth of said vessel is aligned with the lower end of said chute, and said control means includes position sensing means associated with said vessel for permitting opening of said gate only when said vessel is tilted to said predetermined position.

3. The apparatus of claim 2, further characterized in that said position sensing means comprises a limit switch in circuit with said gate operating means, whereby said limit switch prevents energization of said gate operating means and opening of said gate until said vessel is in said predetermined position.

4. In combination; a metallurgical furnace, such as an oxygen steelmaking converter; apparatus for supplying a predetermined weight of coolant material, such as steel scrap, to said furnace; said apparatus comprising a storage bin adapted to contain a bulk supply of coolant material and mounted in an elevated position with respect to said furnace, an elongated chute extending downwardly from said bin, said chute having an upper end arranged to receive coolant material from said bin and a lower end arranged to deliver coolant material to said furnace, conveyor means at the bottom of said bin and arranged to discharge coolant material into the upper end of said chute, drive means for operating said conveyor means, weight measuring means associated with said bin for measuring the weight of coolant material discharged into said chute; and control means for controlling the operation of said drive means and hence the amount of coolant material supplied to said furnace, said control means including means preventing operation of said drive means except when said furnace is in a predetermined coolant-receiving position with respect to the lower end of said chute.

5. The apparatus of claim 4, further characterized in that said furnace comprises an open mouthed vessel adapted to be tilted between an upright position and said predetermined position wherein the mouth of said vessel is aligned wih the lower end of said chute, and said control means includes position sensing means associated with said vessel for permitting operation of said drive means only when said vessel is tilted to said predetermined position.

6. The apparatus of claim 5, further characterized in that said position sensing means comprises a limit switch in circuit with said drive means, whereby said limit switch prevents energization of said drive means until said vessel is in said predetermined position.

7. In combination; a metallurgical furnace, such as an oxygen steelmaking converter; apparatus for supplying a predetermined weight of coolant material, such as steel scrap, to said furnace; said furnace comprising a storage bin adapted to contain a bulk supply of coolant material and mounted in an elevated position with respect to said furnace, an elongated chute extending downwardly from said bin, said chute having an upper end arranged to receive coolant material from said bin and a lower end arranged to deliver coolant material to said furnace, conveyor means at the bottom of said bin and arranged to discharge coolant material into the upper end of said chute, drive means for operating said conveyor means, weight measuring means associated with said bin for measuring the weight of coolant material discharged into said chute, a safety gate in said chute for preventing accidental discharge of coolant material therefrom, and gate operating means for opening and closing said gate; and control means for controlling the operation of said drive means and hence the amount of coolant material supplied to said furnace, said control means including means preventing opening of said gate and operation of said drive means except when said furnace is in a predetermined coolant-receiving position with respect to the lower end of said chute.

8. The apparatus of claim 7, further characterized in that said furnace comprises an open mouthed vessel adapted to be tilted between an upright position and said predetermined position wherein the mouth of said vessel is aligned with the lower end of said chute, and said control means includes position sensing means associated with said vessel for permitting opening of said gate and operation of said drive means only when said vessel is tilted to said predetermined position.

9. The apparatus of claim 8, further characterized in that said position sensing means comprises a pair of limit switches in circuit with said gate operating means and said drive means, respectvely, whereby said limit switches prevent energization of said gate operating means and opening of said gate and also prevent energization of said drive means until said vessel is in said predetermined position.

10. The apparatus of claim 1, further characterized by the provision of first manually operated means for simultaneously energizing said gate operating means and said drive means and second manually operated means for energizing said gate operating means without energizing said drive means.

References Cited

UNITED STATES PATENTS

| | | | |
|---|---|---|---|
| 2,100,315 | 11/1937 | Harper | 222—199 X |
| 2,479,607 | 8/1949 | Downey | 266—27 |

FOREIGN PATENTS 191,683   9/1964   Sweden.

J. SPENCED OVERHOLSER, Primary Examiner

JOHN S. BROWN, Assistant Examiner

U.S. Cl. X.R.

198—39; 214—2, 35; 266—34